United States Patent
Galera et al.

(10) Patent No.: US 11,505,164 B2
(45) Date of Patent: Nov. 22, 2022

(54) WASHING ARRANGEMENT FOR WASHING A SURFACE OF A TARGET DEVICE AND METHOD FOR WASHING A SURFACE OF A TARGET DEVICE USING SAID WASHING ARRANGEMENT

(71) Applicant: Fico Transpar, S.A., Barcelona (ES)

(72) Inventors: Robert Lopez Galera, Barcelona (ES); Olallo Alcaide Hernandez, Barcelona (ES)

(73) Assignee: FICO TRIAD, S.A., Barcelona (ES)

( * ) Notice: Subject to any disclaimer, the term of this patent is extended or adjusted under 35 U.S.C. 154(b) by 405 days.

(21) Appl. No.: 16/516,424

(22) Filed: Jul. 19, 2019

(65) Prior Publication Data
US 2020/0023815 A1    Jan. 23, 2020

(30) Foreign Application Priority Data

Jul. 20, 2018 (EP) .................................... 18382548

(51) Int. Cl.
*B60S 1/56* (2006.01)
*B60S 1/46* (2006.01)
*B60S 1/34* (2006.01)
*B60S 1/52* (2006.01)

(52) U.S. Cl.
CPC ............... *B60S 1/566* (2013.01); *B60S 1/46* (2013.01); *B60S 1/3431* (2013.01); *B60S 1/528* (2013.01)

(58) Field of Classification Search
CPC .. B60S 1/566; B60S 1/46; B60S 1/528; B60S 1/3404; B60S 1/52; B60S 1/522; B60S 1/56; B60S 1/3431; B60R 11/04; B60R 2011/004

USPC .................................. 15/250.04; 134/56 R
See application file for complete search history.

(56) References Cited

U.S. PATENT DOCUMENTS

| | | | |
|---|---|---|---|
| 6,527,000 B1 * | 3/2003 | Randmae | B08B 3/024 134/102.1 |
| 8,567,963 B1 | 10/2013 | Criscuolo et al. | |
| 2010/0269864 A1 * | 10/2010 | Lohrke | B25J 5/02 134/25.3 |
| 2016/0244028 A1 | 8/2016 | Wakatsuki | |
| 2017/0313288 A1 * | 11/2017 | Tippy | B60R 1/0602 |

FOREIGN PATENT DOCUMENTS

DE       102016221858 A1    5/2018

OTHER PUBLICATIONS

Extended European Search Report for European Application No. 18382548.8; Date of Completion: Dec. 18, 2018; date Jan. 3, 2019; 4 Pages.

* cited by examiner

*Primary Examiner* — Katina N. Henson
(74) *Attorney, Agent, or Firm* — Cantor Colburn LLP (57) ABSTRACT

The washing arrangement comprises at least one first wiper driving actuator and at least one second wiper driving actuator to move at least one wiper, and at least one nozzle for injecting washing fluid towards the target device, wherein the wiper driving actuators are linked to each other such that, in use, the wiper is driven by the first wiper driving actuator along a first line to contact the surface of the target device to be washed, and by the second wiper driving actuator along a second line to wipe at least one portion of the surface of the target device.

20 Claims, 4 Drawing Sheets

WASHING ARRANGEMENT FOR WASHING A SURFACE OF A TARGET DEVICE AND METHOD FOR WASHING A SURFACE OF A TARGET DEVICE USING SAID WASHING ARRANGEMENT

CROSS-REFERENCE TO RELATED APPLICATIONS

This application claims the benefit of European Application 18382548.8, filed Jul. 20, 2018, which is incorporated herein by reference in its entirety.

INTRODUCTION

The present disclosure relates to a washing arrangement and method for washing a surface of a target device in a motor vehicle, and more particularly to a washing arrangement adapted to clean sensors.

Sensors, particularly outdoor sensors, such as cameras and other various optical devices generally fitted to the exterior of vehicles are increasingly being used in the automotive sector. Such sensors are usually exposed to dirt, dust, water drops and the like. Debris may accumulate on the sensors and should be removed for optimal sensor performance.

Keeping sensors clean and clear is desirable in the case of autonomous or self-driving cars that may include LIDAR (Light Detection and Ranging) sensors typically fitted on the top of the vehicle for scanning in all directions thereby generating a three-dimensional view of the surroundings of the vehicle. Accumulation of dirt, dust and debris may occlude the LIDAR sensor potentially reducing sensor accuracy.

Traditionally, jets that emit pressurized water are arranged below vehicle windows and/or windscreens as well as on the top of the vehicle and directed toward the sensors. The amount, or volume, of this water, used to keep the sensors clean, is large. Moreover, the high consumption of water may result in undesirable water ingress into the vehicles, through, for example, partially open windows.

In order to increase efficiency, washing arrangements based on motor-driven wipers in combination with water and/or air nozzles for ejecting a washing fluid in order to clean a surface of a sensor are also currently used. Examples of such washing arrangements are disclosed in US2016121855 and US2017151933. Spray nozzles are provided adjacent a dome base on the roof of a vehicle combined with motor-driven wiper blades arranged around the dome. In use, the wiper blades are deployed while rotated in one direction. Rotation of wiper blades in an opposite direction causes them to be arranged into a collapsed position. A cleaning fluid is dispensed from the nozzles as the wiper blades rotate around the dome.

US2016244028 discloses a wiping device for maintaining the detection precision of a sensor. The wiping device includes a wiping mechanism with a rotary shaft that is coupled to a motor drive shaft, and wipers having an arm extending diagonally downward on progression from the rotary shaft and a rubber wiper blade attached to the arm. The device also includes nozzles for supplying washing fluid. The nozzles are attached to the rotary shaft and are arranged to swing around together with the wipers as the rotary shaft is rotated.

US2018009418 discloses a sensor cleaning system including at least one wiper blade configured to move from a first position to a second position in combination with a fluid-directing nozzle configured to direct pressurized fluid to clean a sensor area. The nozzle may be moved to target a particular region of the sensor area. The wiper blade is attached to a moveable carriage that is actuated via a motor, a solenoid, or others types of actuators.

Unfortunately, known cleaning devices are complex in design because of the use of mechanical means such as a motor for operating the wiper. In such, application electrical components can short circuit arising from the combination with hydraulic parts (i.e. the washing fluid). In addition, substantially high amounts of cleaning fluid are still required for effectively cleaning sensors which is also undesirable.

SUMMARY

A washing arrangement is adapted to wash a target device such as a surface of a sensor lens in a wide range of different sensors applied to motor vehicles. The present washing arrangement may be very efficient for washing sensors having a cylindrical shape, although it can also be efficiently applied to many other different sensor geometries.

The washing arrangement comprises at least one first wiper driving actuator and at least one second wiper driving actuator. At least one of the wiper driving actuators are operable, (e.g., telescopically) from a retracted or collapsed condition into an extended or operating condition. This may be performed by flowing washing fluid through the wiper driving actuators.

At least one wiper is also configured to contact the target device to be washed so as to wipe at least one portion of its surface, such as for example a surface of a sensor lens in motor vehicle sensors, to remove dirt or liquid therefrom. The wiper may in some cases be formed of a plurality of sections.

The first wiper driving actuator is operable, (e.g., telescopically) to move the at least one wiper from a first position to a second position, or from the second position to the first position, along a first line. Operation of the first wiper driving actuator may be carried out by the washing fluid as it is pumped from a source of fluid, for example.

In turn, the second wiper driving actuator is also operable, (e.g., telescopically) to move the wiper from a first position to a second position, or from the second position to the first position, along a second line. Operation of the second wiper driving actuator may be carried out by the washing fluid as the fluid is pumped from a source of fluid, for example. In a preferred example, the first wiper driving actuator is driven by the second wiper driving actuator causing the wiper to be moved (i.e., for washing the target device).

Operation of the first wiper driving actuator and the second wiper driving actuator may be performed through the same fluid lines or through two different fluid lines.

In one embodiment, the second position associated with telescopic actuators, is a position that is more extended than the first position along at least one of the first line or the second line. In other words, the length along which the wiper driving actuators are extended at the second position is longer than the length along which the wiper driving actuators are extended at the first position along the first line and/or the second line. In one embodiment, the second line is inclined with respect to the first line, and in one example, may be inclined by about ninety degrees (90°). Other angles for the inclination of the first line and the second line are also possible. This includes non-inclined arrangements of the first line and the second line (i.e., inclined with respect to each other at an angle of zero degrees (0°)). As used herein, a line refers to an axis that defines a direction of movement.

The first wiper driving actuator and the second wiper driving actuator are mechanically linked to each other and may also be fluidly linked. As a result, in use, the wiper is driven by the first wiper driving actuator along the first line to contact at least one portion of the surface of the target device to be washed, and also by the second wiper driving actuator along the second line to wipe said portion of the surface of the target device.

Although not described in detail, an external source of washing fluid is provided for supplying washing fluid into the wiper driving actuators. As the washing fluid is driven from the external source, for example by means of a pump, when the first and second actuators are fluidly linked, the washing fluid would enter the washing arrangement causing the first and second wiper driving actuators to be operated (i.e., telescopically extended). When the wiper driving actuators are fully extended, or the end of their path has been reached, or they are extended up to a given length (i.e., such that the surface of the target device is properly cleaned), fluid ejection is stopped, and the driving actuators are retracted. Retraction of the telescopic driving actuators may be performed by spring mechanisms that will be described further below. During retraction of the telescopic driving actuators, the washing fluid may either still be ejected towards the surface of the target device, or it may be prevented from being ejected as desired.

Driving of the wiper along two different lines through a single, common driving source, that is, the washing fluid, results in a very simple washing arrangement, with few components involved while debris and dust are very efficiently removed as well as the rest of the washing fluid itself. This, combined with the absence of electric components, such as for example an electric motor, results in the safe use of liquids without the concern of electric components.

The present washing arrangement further comprises at least one nozzle or fluid ejector for injecting washing fluid towards the surface of the target device to be washed for cleaning at least one portion thereof.

The first and second wiper driving actuators each comprise telescopic elements that extend to reach a given location to eject washing fluid, and for the wiper to properly contact the target device to be cleaned. The telescopic elements are arranged to be driven by the washing fluid. A fluid chamber may be formed within the wiper driving actuators for containing washing fluid therein. A pin may be provided inside the chamber arranged for selecting at which point of the surface of the target device the washing fluid is caused to be ejected from the nozzles. As a result, the amount of washing fluid used is advantageously reduced.

Movement of the wiper by the at least one first wiper driving actuator and the at least one second wiper driving actuator avoids parts of the motor vehicle from being contacted or collided by the wiper during use for performing the washing operation. The wiper can be also moved towards and away from the walls or surfaces of the target device to be cleaned, and also driven onto said walls or surfaces while wiping it so as to clean and dry at least one portion thereof. When the wiper driving actuators have reached their retracted or collapsed condition, the wiper may be kept hidden as required either under the outer surface of the vehicle, at least out of reach of the parts to be cleaned, or out of the field of view of the part to be cleaned, for example in the case of an optical surface.

Two different approaching movements of the wiper relative to the surface of the target device will be now described in detail.

EXAMPLE 1: RADIAL APPROACHING MOVEMENT OF THE WIPER

In a first advantageous example of the present washing arrangement, a washing structure is provided. The washing structure is arranged to at least partially surround the surface of the target device. This example may be suitable for example where the target device is cylindrical in shape as with many commonly used vehicle sensors. In this case, the washing structure may be for example ring shaped, and arranged surrounding the surface of the cylindrical target device. In this specific case, the ring-shaped washing structure may comprise a ring assembly defined for example by two or more semi-ring elements connected with each other through the above mentioned first wiper driving actuator to form the washing structure. The semi-ring elements can be thus driven from the first position to the second position or from the second position to the first position along the first line. As used herein, a semi-ring is defined as a ring divided in two parts which may be equal to each other or not. Thus, both semi-rings together define the ring-shaped washing structure.

In this example, the at least one nozzle and the at least one wiper may be both carried directly or indirectly by the washing structure so that the at least one wiper can be brought into contact with the target device for wiping its side surface as the washing structure is driven by the second wiper driving actuator along the second line to wipe the portion of the surface of the target device.

As stated above, the second line is inclined with respect to the first line, such as for example about 90°, although other different angles for the inclination of the first line and the second line are also possible.

A guide structure may be attached to the motor vehicle along which the washing structure can be moved by the second wiper driving actuator along the second line.

In operation, during the extension process of both actuators along the first and second lines, the nozzles, carried by the washing structure, inject washing fluid towards the surface of the target device to be washed for cleaning at least one portion thereof. Then, the washing structure with the wiper(s) is driven along the first line to contact the surface of the target and along the second line to wipe the surface of the target device in respective opposite directions, for example by spring action of springs. During the retracted process no fluid is pumped. Wiping action could be carried out simultaneously with injection of washing fluid from the nozzles when the nozzles are not fluidly linked to the washing structure.

In this first example, the wiper can be driven along the first line as the washing structure is actuated by the first wiper driving actuator from a second position to a third position with the wiper contacting the surface of the target device along the first line, that is, an intermediate position between the first position and the second position. Also, driving of the wiper along the second line is performed by driving the washing structure by the second wiper driving actuator from the second position to a third position, which is also an intermediate position between the first position and the second position.

Although in this first example, the third position is not essential, it could exist with the wiper contacting the surface of the target device for improving contact providing a higher-pressure contact.

EXAMPLE 2: LINEAR APPROACHING MOVEMENT OF THE WIPER

In this example, the first wiper driving actuator is also arranged to drive the wiper along a first line, and the second wiper driving actuator is arranged to drive the wiper along a second line. The second line may be inclined with respect to the first line, such as for example about 90°. Other different angles are also possible.

The at least one nozzle and the at least one wiper are carried by the first wiper driving actuator. As in the first example, a washing structure is provided. In this case, the washing structure is defined by said at least one nozzle and said at least one wiper.

In operation, washing fluid is pumped causing the extension of both first and second wiper driving actuators along the first and second lines. When no fluid is pumped, the wiper is caused to move along the first line to contact the surface of the target device and along the second line to wipe the surface of the target device in respective opposite directions, for example by spring action of springs. Wiping action could be carried out simultaneously with injection of washing fluid from the nozzles if the nozzles are not fluidly linked to the washing structure.

This second example may be applied to target devices such as sensors other than cylindrical sensors. Thus, in this case the washing structure is not provided surrounding the surface of the target device. In this second example, the surface of the target device is contacted, i.e. wiped, by the wiper when wiping it as it is moved along the second line as stated above. The wiper driving actuators are arranged to drive the nozzles and hide them inside of a bracket, so that it is out of the sensor field of view and remain protected when not in use.

Also, in this example, a third position may exist along the first line with the wiper contacting the surface of the target device for improving contact providing a higher-pressure contact.

As stated above, spring mechanisms may be provided in both examples of the present washing arrangement for respectively biasing at least one of the first wiper driving actuator or second wiper driving actuator along the first and second lines when no washing fluid is being pumped. The spring mechanisms may comprise compression springs or other equivalent elements suitable for pulling on the first wiper driving actuator and the second wiper driving actuator for returning them back to the second position, corresponding to their retracted, rest position, at which time no washing fluid is supplied. For example, if the washing fluid is supplied from the above-mentioned external source of washing fluid by a pump, the pump is stopped and then the first and second wiper driving actuators are brought to their respective retracted, rest positions.

In some examples, it may be preferred that the spring mechanisms have mutually different spring rates. As a result, the wiper may be driven by the first wiper driving actuator and by the second wiper driving actuator at different times from the first position to the second position along the first line or the second line. In other examples, driving of the wiper along the first line may be also performed simultaneously with the step of driving the wiper along the second line if required.

Thus, according to the present disclosure of the present washing arrangement, the wiper(s) can be driven by two separate driving actuators along to different lines: one driving actuator being intended for moving the wiper(s) towards and away from the target device and the other for moving the wiper(s) along the target device for wiping its surface in a washing operation. In the present washing arrangement both wiper driving actuators are operated by the same washing fluid used for washing the target device.

In general, for washing a surface of a target device that is fitted on a vehicle using the present washing arrangement, the washing arrangement is actuated such that washing fluid is pumped from the external fluid source to flow through the wiper driving actuators causing the wiper driving actuators to be driven along the first and second lines. Washing fluid is injected from the nozzle(s) towards the surface of the target device to be washed. When the washing operation has been completed, the pump stops pumping washing fluid, so fluid is not ejected from the nozzles and wiper is driven by the spring action of the above-mentioned springs, for example, along the first and second lines with the wiper contacting the surface of the target device removing debris, dust and water therefrom.

Although it may be preferred that washing fluid is prevented from being injected from the nozzle as the wiper is driven contacting the surface of the target device, examples where washing fluid is injected as the wiper is driven contacting the surface of the target device are also envisaged.

The present disclosure further relates to a method for washing a surface of a target device that is fitted on a vehicle. Said method comprises providing the above described a washing arrangement; injecting washing fluid from the nozzle towards the surface of the target device to be washed; driving the wiper by the first wiper driving actuator towards the surface of the target device to be washed along the first line X; and driving the wiper by the second wiper driving actuator along the second line Y with the wiper contacting the surface of the target device.

As described above, the washing arrangement may comprise a washing structure at least partially surrounding the surface of the target device. The above described wiper or wipers are carried by said a washing structure. In such case, the step of driving the wiper along the first line X is performed by driving said washing structure by the first wiper driving actuator from a second position to a third position along the first line X, and the step of driving the wiper along the second line Y is performed by driving said washing structure by the second wiper driving actuator from the second position to a third position with the wiper contacting the surface of the target device.

In some examples, the washing fluid may be prevented from being injected from the nozzle as the wiper is driven contacting the surface of the target device. In some cases, it may be advantageous that driving the wiper along the first line X is performed simultaneously with the step of driving the wiper along the second line Y.

The following clauses define various aspects of the present disclosure:

Clause 1. A washing arrangement for washing a surface of a target device in a motor vehicle, the washing arrangement comprising:
  a washing structure arranged for at least partially surrounding the surface of the target device and carrying at least one nozzle and at least one wiper;
  at least one first wiper driving actuator to move the washing structure from a first position to a second position or from the second position to the first position along a first line X;
  at least one second wiper driving actuator operable to move the washing structure from a first position to a second position or from the second position to the first position along a second line Y;
  whereby the second position is a position more extended than the first position along at least one of the first line X or the second line Y; and wherein the first and second wiper driving actuators are linked to each other such that, in use, the washing structure is driven along the first line X such that the wiper contacts at least one portion of the surface of the target device to be washed, and by the second wiper driving actuator along the second line Y such that the wiper wipes said portion of the surface of the target device.

Clause 2. The washing arrangement as defined in clause 1, wherein the first wiper driving actuator is telescopically operable to move the washing structure.

Clause 3. The washing arrangement as defined in clause 1 or 2, wherein the second wiper driving actuator is telescopically operable to move the washing structure.

Clause 4. The washing arrangement as defined in any of the preceding clauses, wherein at least one of the first and second wiper driving actuators is operable by the washing fluid.

Clause 5. The washing arrangement as defined in any of the preceding clauses, wherein the second line Y is inclined with respect to the first line X.

Clause 6. The washing arrangement as defined in clause 5, wherein the inclination of the second line Y with respect to the first line X is of about 90°.

Clause 7. The washing arrangement as defined in any of the preceding clauses, wherein the washing arrangement is configured for:
  injecting washing fluid from the nozzle towards the surface of the target device 210 to be washed;
  driving the washing structure by the first wiper driving actuator along the first line X until the surface 210 of the target device is contacted by the wiper; and
  driving the washing structure (by the second wiper driving actuator) along the second line Y with the wiper contacting the surface of the target device.

Clause 8. The washing arrangement as defined in any of the preceding clauses, wherein the washing structure comprises a ring assembly defined by at least two semi-ring elements connected with each other through the first wiper driving actuator for driving the semi-ring elements from the first position to the second position or from the second position to the first position along the first line X.

Clause 9. The washing arrangement as defined in any of the preceding clauses, wherein the wiper is formed of a plurality of sections.

Clause 10. The washing arrangement as defined in any of the preceding clauses, wherein it further includes respective spring mechanisms for biasing the first and second wiper driving actuators along the first- and second-lines X, Y, respectively.

Clause 11. The washing arrangement as defined in clause 10, wherein said spring mechanisms have mutually different spring rates such that the wiper is driven by the first wiper driving actuator and by the second wiper driving actuator at different times from the first position to the second position along the first line X or the second line Y.

Clause 12. The washing arrangement as defined in any of the preceding clauses, wherein the nozzle is configured for injecting washing fluid only when at least one of the first and second wiper driving actuators has been extended by a determined length.

Clause 13. A washing arrangement for washing a surface of a target device in a motor vehicle, the washing arrangement comprising:
  at least one nozzle for injecting a washing fluid against at least one portion of a surface of a target device;
  at least one wiper to wipe said surface of the target device;
  at least one first wiper driving actuator operable to move the wiper from a first position to a second position or from the second position to the first position along a first line X;
  at least one second wiper driving actuator operable by the washing fluid to move the wiper from a first position to a second position or from the second position to the first position along a second line Y;
  wherein the first wiper driving actuator is driven by the second wiper driving actuator to move along the second line Y; and
  wherein the second position is a position more extended than the first position along at least one of the first line X or the second line Y; and
  wherein the first and second wiper driving actuators are fluidly and mechanically linked to each other such that, in use, the wiper is driven along the first line X such that it contacts at least one portion of the surface of the target device to be washed, and by the second wiper driving actuator along the second line Y such that the wiper wipes said portion of the surface of the target device.

Clause 14. The washing arrangement as defined in clause 13, wherein the second line Y is inclined with respect to the first line X.

Clause 15. The washing arrangement as defined in clause 14, wherein the inclination of the second line Y with respect to the first line X is of about 90°.

Clause 16. The washing arrangement as defined in any of the clauses, 13-15, wherein the washing arrangement is configured for:
  driving the wiper by the first wiper driving actuator along the first line X until the surface of the target device is contacted by the wiper;
  injecting washing fluid from the nozzle towards the surface of the target device to be washed; and
  driving the wiper 130 by the second wiper driving actuator along the second line Y with the wiper contacting the surface of the target device.

Clause 17. The washing arrangement as defined in any of the clauses, 13-16, wherein the wiper is formed of a plurality of sections.

Clause 18. The washing arrangement as defined in any of the clauses, 10-14, wherein it further includes respective spring mechanisms for biasing the first and second wiper driving actuators along the first- and second-lines X, Y, respectively.

Clause 19. The washing arrangement as defined in clause 18, wherein said spring mechanisms have mutually different spring rates such that the wiper is driven by the first wiper driving actuator and by the second wiper driving actuator at different times from the first position to the second position along the first line X or the second line Y.

Clause 20. The washing arrangement as defined in any of the clauses 13-19, wherein the nozzle is configured for injecting washing fluid only when at least one of the first and second wiper driving actuators has been extended by a determined length.

Clause 21. The washing arrangement as defined in any of the preceding clauses, wherein the second wiper driving actuator is designed to move the wiper in a substantially perpendicular direction to a surface of the target device.

Clause 22. The washing arrangement as defined in any of the preceding clauses, wherein the first and second wiper driving actuators mechanically linked to each other.

Clause 23. The washing arrangement as defined in any of the preceding clauses, wherein the first and second wiper driving actuators fluidly linked to each other.

Clause 24. The washing arrangement as defined in any of the preceding clauses, wherein at least one nozzle is fluidly linked to at least one of the wipers driving actuators.

Clause 25. A method for washing a surface of a target device that is fitted on a vehicle, the method comprising:
providing a washing arrangement as defined in any of the preceding clauses;
driving the wiper by the first wiper driving actuator towards the surface of the target device to be washed along the first line X;
injecting washing fluid from the nozzle towards the surface of the target device 210 to be washed;
driving the wiper by the second wiper driving actuator along the second line Y with the wiper contacting the surface of the target device.

Clause 26. The method defined in clause 25, wherein:
the washing arrangement comprises a washing structure at least partially surrounding the surface of the target device and carrying the at least one wiper;
the step of driving the wiper along the first line X is performed by driving the washing structure by the first wiper driving actuator from a second position to a third position along the first line X; and
the step of driving the wiper along the second line Y is performed by driving the washing structure by the second wiper driving actuator from the second position to a third position with the wiper contacting the surface of the target device.

Clause 27. The method of clause 25 or 26, wherein washing fluid is prevented from being injected from the nozzle as the wiper is driven contacting the surface of the target device.

Clause 28. The method of any of the clauses 25-27, wherein the step of driving the wiper along the first line X is performed simultaneously with the step of driving the wiper along the second line Y.

Many advantages over prior art washing devices are obtained by the present washing arrangement. The combination of a driven wiper for cleaning and drying at least one portion of a surface of a target device in a motor vehicle sensor by friction, that is, for wiping said surface together with the use of washing fluid, has been found to provide a number of important advantages. While dirt, dust and debris on a surface of a target device are effectively removed and dried, especially from sensors which are difficult to clean, due to the efficient cleaning fluid action combined with the wiper action, problems arising from electric parts, such as a motor and other associated elements together with fluids flowing in the assembly such as the washing fluid used for cleaning the target device as in the prior art devices are eliminated. Also, the resulting washing arrangement is very simple and cost effective, and the amount of cleaning fluid required for effectively cleaning sensors has been found to be advantageously reduced.

Additional objects, advantages and features of examples of the present washing arrangement and method for washing a surface of a target device will become apparent to those skilled in the art upon examination of the description or may be learned by practice thereof.

BRIEF DESCRIPTION OF THE DRAWINGS

Other features, advantages and details appear, by way of example only, in the following detailed description, the detailed description referring to the drawings in which:

Two particular examples of the present washing arrangement are described in the following by way of non-limiting examples, with reference to the appended drawings, in which:

FIG. 5c is an enlarged, fragmentary top plan view of the washing structure in FIG. 5a;

FIG. 5d is an enlarged, fragmentary top plan view of the washing structure in FIG. 5b;

DETAILED DESCRIPTION

FIGS. 1-8 of the drawings show two different examples of a washing arrangement 100 according to two different wiper movements relative to a surface 210 of a target device 200.

The washing arrangement 100 in both examples is intended for washing the surface 210 of the target device 200 or at least one portion thereof. In this case, the target device is a sensor lens 200. The present washing arrangement 100 can be also applied to many other devices that are required to be kept clean and clear so as to perform their intended function effectively.

Reference is now made to the example of radial approaching movement of the wiper shown in FIGS. 1-5a-d of the drawings. In this example, the sensor lens 200 to be cleaned is cylindrical in shape. The washing arrangement 100 comprises a ring-shaped washing structure 110 arranged for at least partially surrounding the surface 210 of the sensor lens 200. The washing structure 110 comprises in this example two semi-ring elements 110a, 110b connected with each other through a first wiper driving actuator 140 that will be described below for driving the semi-ring elements 110a, 110b along a first line X (horizontal line in the Example 1 shown in FIGS. 1-5a-d).

Figure 1:
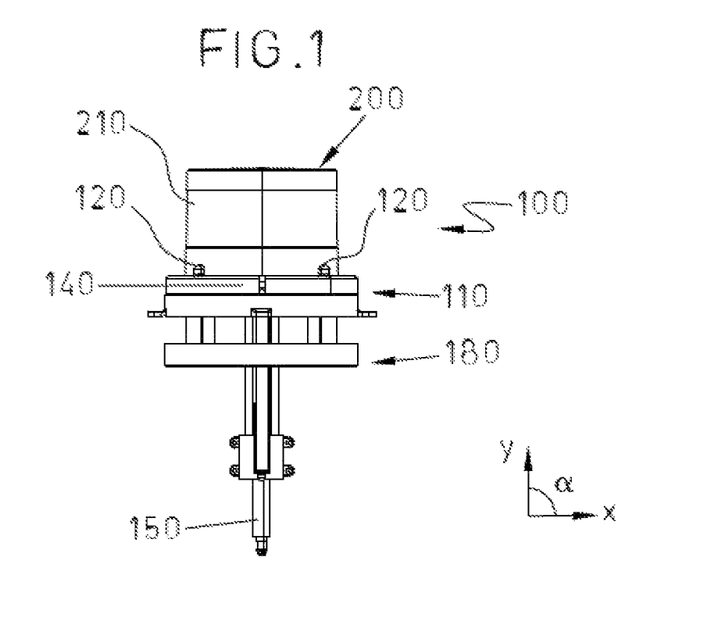
FIG. 1 is a front elevational view of a first example corresponding to a radial approaching movement of the wiper in the present washing arrangement.
Figure 2:
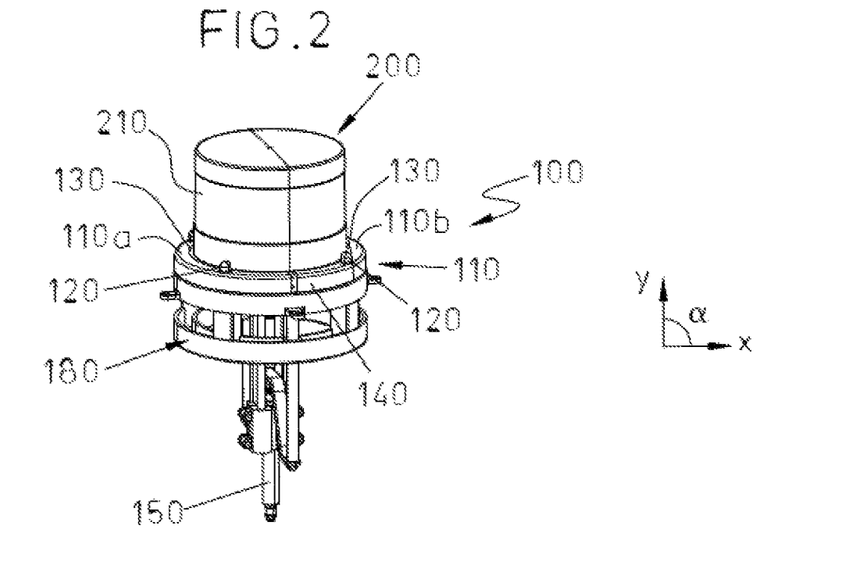
FIG. 2 is a perspective view of the first example shown in FIG. 1.
Figure 3:
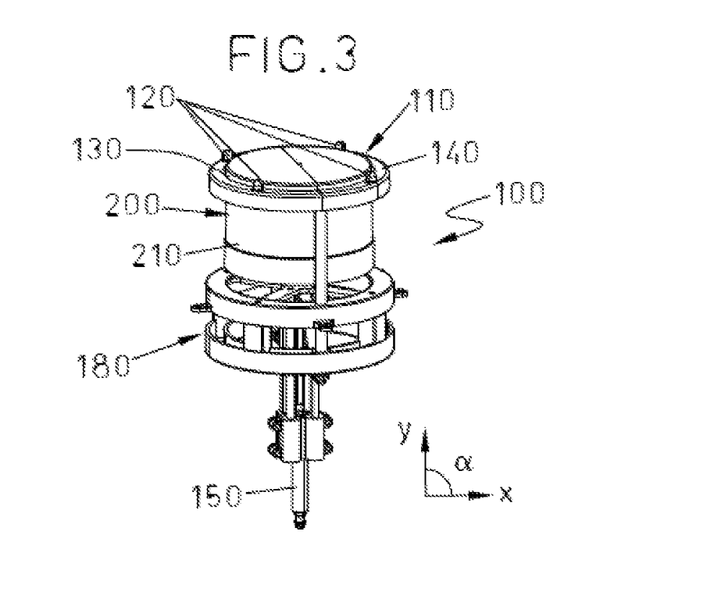
FIG. 3 is a perspective view of the first example shown in FIG. 1 and FIG. 2 with the washing structure in a lowermost position.
Figure 4:
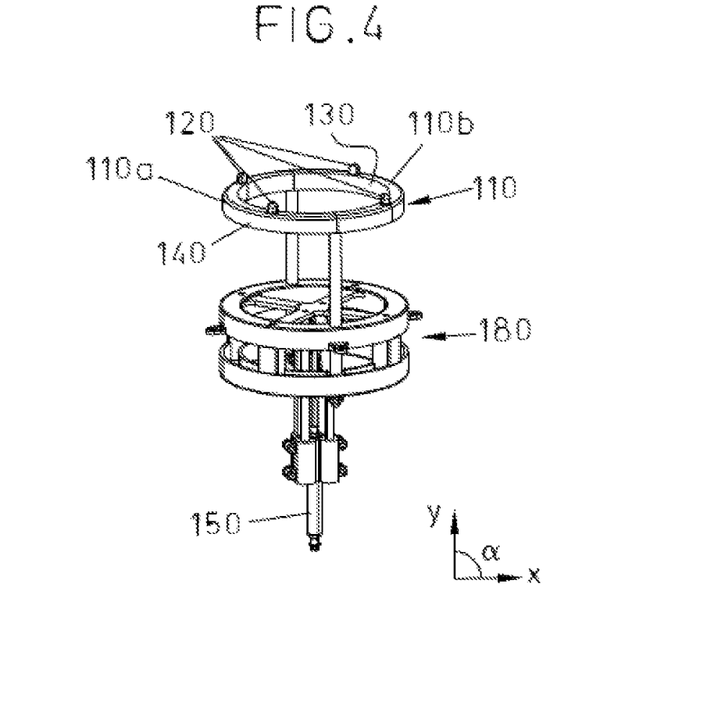
FIG. 4 is a perspective view of the first example shown in FIGS. 1-3 where the target device is not shown for the sake of clarity.

The washing arrangement 100 further comprises the above mentioned first wiper driving actuator 140 and also second wiper driving actuator 150. Both wiper driving actuators 140, 150 are telescopically operable by the washing fluid as it is supplied by a pump, not shown, from an external fluid source, also not shown. Both wiper driving actuators 140, 150 can be telescopically extended from a retracted or collapsed condition into an extended or operating condition as shown in FIG. 1 by the washing fluid being supplied against the spring force of at least one spring, not shown in the drawings.

The washing arrangement 100 further comprises a number of wipers 130 attached to the washing structure 110. The wipers 130 are suitably designed to remove dirt, dust and debris from the surface 210 of the sensor lens 200 as well as to remove water therefrom. The wipers 130 may be detachable for maintenance and replacement operations. The wipers 130 may be movably mounted on a fixed base so as to properly adapt to the surface 210 of the sensor lens 200 during operation. In the example shown, the wipers 130 are formed of a plurality of sections. The wipers 130 may be arranged overlapping each other for washing the surface 210 of the sensor lens 200. This is particularly advantageous for preventing the dirty portions in the area where sections are joined in the surface 210 of the sensor lens 200.

The first wiper driving actuator 140 and the second wiper driving actuator 150, that is, their sections, are configured to be telescopically driven to move the wipers 130, along a first line X, and also along a second line Y. Specifically, the first wiper driving actuator 140 is arranged to drive the washing structure 110 with wipers 130 attached thereto from a first position to a second position, away from the sensor lens 200 (that is, towards the position shown in FIGS. 5a and 5c with the semi-ring elements 110a, 110b of the washing structure 110 arranged with their respective ends separated from each other), or from the second position to the first position along a first line X, towards the sensor lens 200 (that is, towards the position shown in FIGS. 5b and 5d with the semi-ring elements 110a, 110b of the washing structure 110 arranged with their respective ends close together). In turn, the second wiper driving actuator 150 is also arranged to drive the wipers 130 from a first position to a second position or from the second position to the first position along a second line Y along the surface 210 of the cylindrical sensor lens 200. Movement along the second line Y may correspond to an upward and downward movement of the wipers 130 relative to a cylindrical sensor lens 200 that is arranged in a vertical position. As stated above, telescopic extension of the driving actuators 140, 150 is performed by washing fluid pumped from a source of fluid, while their retraction is performed by the spring action of one or more springs, not shown in the drawings, when no washing fluid is supplied.

In general, the second position is telescopically more extended than the first position along at least one of the first line X or the second line Y. In other words, the length along which the wiper driving actuators 140,150 are extended at the second position is longer than the length along which the wiper driving actuators are extended at the first position along the first line X and/or the second line Y. The second position may correspond to an extended or operating position and the first position may correspond to a retracted or collapsed rest position. In this example, the second line Y is inclined 90° with respect to the first line X.

In the embodiments shown, it may be preferred that the first wiper driving actuator 140 is designed to move the wiper 130 in a substantially perpendicular direction to the surface 210 of the target device 200. Other directions for the operation of the first wiper driving actuator 150 relative to the surface 210 of the target device 200 are possible.

In this example, the first driving actuator 140 is fluidly and mechanically linked to the second wiper driving actuator 150, although examples where the first driving actuator 140 is only mechanically linked to the second wiper driving actuator 150 are possible. Thus, in use, the wipers 130 are driven by the first wiper driving actuator 140 along the first line X to contact the surface 210 of the cylindrical sensor lens 200 to be washed as in the position shown in FIGS. 5b and 5d, and also by the second wiper driving actuator 150 along the second line Y to wipe said the surface 210 of the cylindrical sensor lens 200. Both movements of the wipers 130 along the first line X and along the second line Y are caused by the same driving source, that is, the washing fluid flowing through the first and second wiper driving actuators 140, 150.

Nozzles or fluid ejectors 120 are also provided in the washing arrangement 100 for injecting washing fluid towards the surface 210 of the cylindrical sensor lens 200 at sufficient pressure to properly cleaning at least one portion thereof. The nozzles 120 may be configured for injecting washing fluid only when at least one of the first and second wiper driving actuators 140, 150 has been telescopically extended by a determined length. The nozzles 120 are fluidly linked to the first wiper driving actuator 140 although they could neither be fluidly nor mechanically linked thereto.

As stated above, compression springs, not shown, are provided for biasing the first wiper driving actuator 140 and the second wiper driving actuator 150 along the first- and second-lines X, Y for returning them back to their retracted, rest position.

Figure 5A:
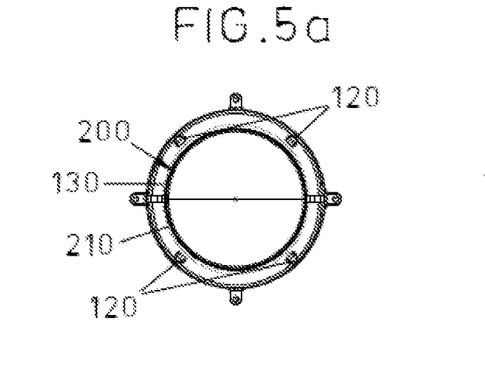
FIG. 5a is a top plan view of the washing structure corresponding to the first example of FIGS. 1-4 showing the washing structure in a position such that the wipers are arranged away from the surface of the target device.
Figure 5B:
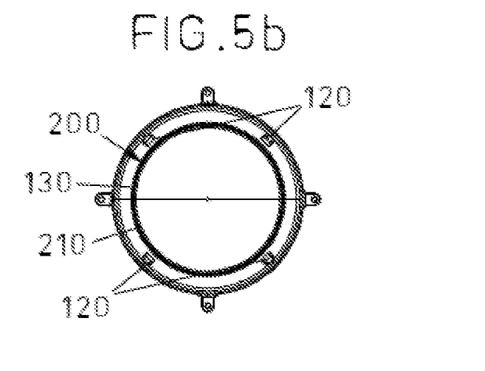
FIG. 5b is a top plan view of the washing structure corresponding to the first example of FIGS. 1-4 showing the washing structure in a position such that the wipers are arranged in contact with the surface of the target device.
Figures 5C, 5D:
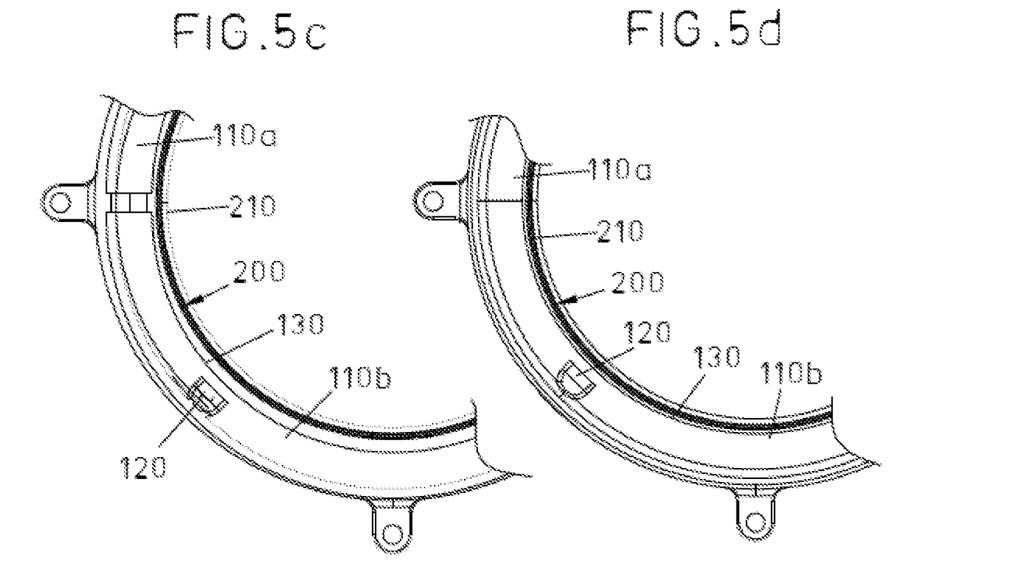

The operating mode in this first example of the present washing arrangement 100 is as follows. Washing fluid is driven from the external source by the pump to flow into the washing arrangement 100 causing the first and second wiper driving actuators 140, 150 to be telescopically extended. As a result of the operation of the wiper driving actuators 140, 150, the wipers 130 are caused to move along the first line X away from the surface 210 of the sensor lens 200 towards the position shown in FIGS. 5a and 5c with the semi-ring elements 110a, 110b of the washing structure 110 arranged with their respective ends close together, and the wipers 130 are driven upward along the second line Y towards the sensor lens 200 while projecting washing fluid. Once no washing fluid is delivered (or fluid is delivered such that its hydraulic action is lower than the spring force of the springs), and due to the spring action of the compression springs, not shown in the drawings, the driving actuators 140, 150 are telescopically retracted into their respective retracted, rest positions. The wipers 130 are then moved along the first line X towards the sensor lens 200 until it is brought into contact with the surface 210 of the sensor lens 200 as shown in FIGS. 5b and 5d, and the wipers 130 are driven downward along the second line Y away from the sensor lens 200 while the surface 210 of the sensor lens 200 is wiped.

Figure 6:
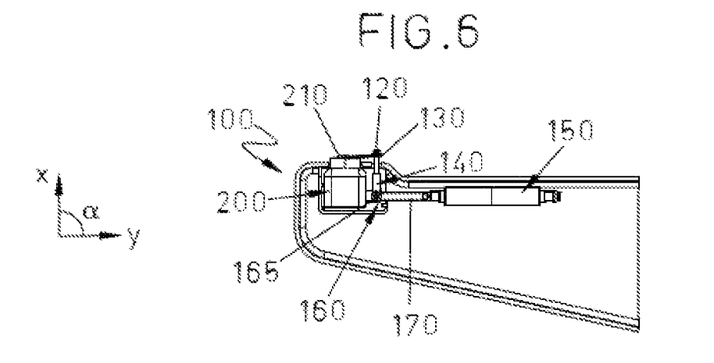
FIG. 6 is a side elevational view of a second example corresponding to a linear approaching movement of the wiper in the present washing arrangement.
Figure 7:
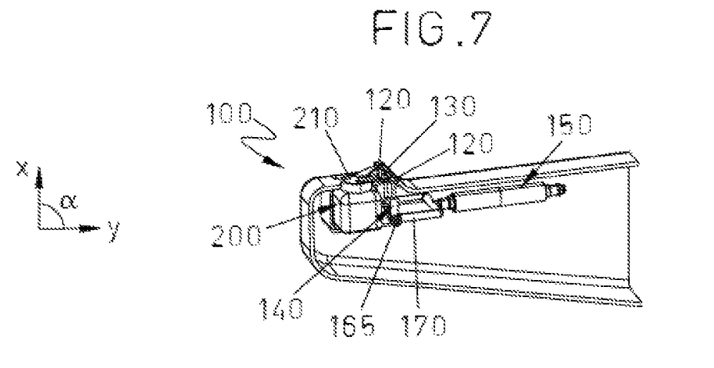
FIGS. 7 and 8 are perspective views of the second example shown in FIG. 6 showing the wiper driving actuators in different positions.
Figure 8:
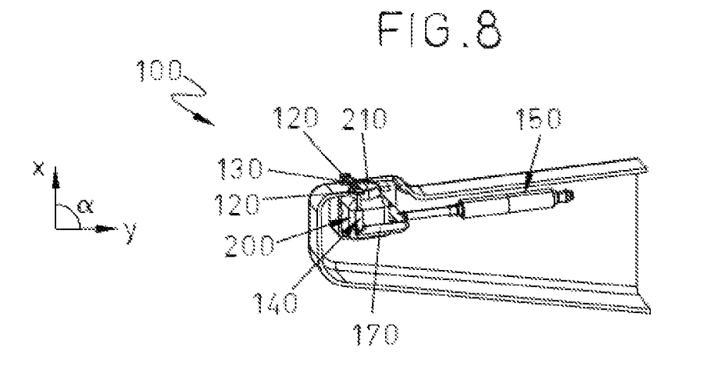

Reference is now made to the example of linear approaching movement of the wiper shown in FIGS. 6-8 of the drawings. The washing arrangement 100 in this example comprises two first wiper driving actuators 140 which, as shown in FIGS. 6-8, correspond to two parallel vertical telescopic actuators 140 fluidly linked to each other by a bracket 170. The washing arrangement 100 in this second example of the present washing arrangement 100 further comprises a second wiper driving actuator 150 which, as shown in FIGS. 6-8, corresponds to a horizontal actuator 150 which is in turn also fluidly linked to bracket 170. Side wheels 165 may be provided in the two first wiper driving actuators 140 arranged to freely roll on respective fixed rails 160 to provide for a guided movement of bracket 170.

As in the first example, in this second example, the first driving actuator 140 is fluidly and mechanically linked to the second wiper driving actuator 150, although examples where the first driving actuator 140 is only mechanically linked to the second wiper driving actuator 150 are possible.

The first wiper driving actuators 140 and the second wiper driving actuator 150 are telescopically operable along the vertical line X and along the horizontal line Y depicted in FIGS. 6-8 by the washing fluid as it is supplied by the pump from the external fluid source from a retracted or collapsed condition into an extended or operating condition as the washing fluid is supplied.

A wiper 130 is provided extending between the two first wiper driving actuators 140. The wiper 130 is suitably designed to remove dirt, dust and debris from the surface 210 of the sensor lens 200 as well as to remove water therefrom. The wiper 130 may be detachable for maintenance and replacement operations.

As in the first example, a washing structure is provided which in this case is defined by the nozzles 120 and the wiper 130.

In this second example of the present washing arrangement 100, the first wiper driving actuators 140 and second wiper driving actuator 150 can be telescopically driven to move the wiper 130 along the first line X and along the second line Y shown in FIGS. 6-8.

Specifically, the first wiper driving actuator 140 in this second example is designed to move the wiper 130 from a first position to a second position along a first line X that is substantially perpendicular to the surface 210 of the target device 200 and from a first position to a second position along a second line Y, perpendicular to the first line X.

More specifically, the wiper 130 can be moved along the first line X towards the sensor lens 200 for contacting it, upwards in FIGS. 6-8, or away from the sensor lens 200, downwards in FIGS. 6-8. Also, the wiper 130 can be moved along the second line Y towards the sensor lens 200, to the left in FIGS. 6-8, or away from the sensor lens 200, to the right in FIGS. 6-8 to wipe it.

Thus, the length along which the wiper driving actuators 140,150 are telescopically extended at the second position is longer than the length along which the wiper driving actuators 140, 150 are telescopically extended at the first position along the first line X and/or the second line Y. The second position may for example correspond to an extended or operating position and the first position of the wiper driving actuators 140, 150 may correspond to a retracted or collapsed rest position.

In this second example of the present washing arrangement 100, the first driving actuator 140 is fluidly and mechanically linked to the second wiper driving actuator 150. Thus, in use, the wiper 130 is driven by the two first wiper driving actuators 140 along the first line X to contact the surface 210 of the sensor lens 200 to be washed. Contact of the wiper 130 with the surface 210 of the sensor lens 200 depends on the direction and the position of the second wiper driving actuator 150. The wiper 130 is also driven by the second wiper driving actuator 150 along the second line Y to wipe said the surface 210 of the sensor lens 200. Both movements of the wiper 130 along the first line X and along the second line Y are caused by the same driving source, that is, the washing fluid flowing through the first and second wiper driving actuators 140, 150.

A nozzle or fluid ejector 120 is provided in each of the first wiper driving actuators 140 for injecting washing fluid towards the surface 210 of the sensor lens 200 at sufficient pressure to properly cleaning at least one portion thereof. The nozzles 120 are configured for injecting washing fluid only when at least one of the first and second wiper driving actuators 140, 150 has been telescopically extended by a determined length. The nozzles 120 are fluidly linked to the first wiper driving actuator 140 although they could neither be fluidly nor mechanically linked thereto.

Compression springs, not shown, are provided for biasing the first wiper driving actuator 140 and the second wiper driving actuator 150 along the first- and second-lines X, Y for returning them back to their retracted, rest position.

The operating mode in this linear wiper approaching example of the present washing arrangement 100 is as follows. Washing fluid is driven by a pump from an external source, both not shown in the drawings, to enter the second wiper driving actuator 150 causing it to be telescopically extended to the left in the drawing along line Y towards the sensor lens 200 and to enter the first wiper driving actuator 140 causing it to be telescopically extended upward along line X while washing fluid is supplied through nozzles 120 arranged on the two first wiper driving actuators 140 to the surface 210 of the sensor lens 200.

Once no washing fluid is delivered (or fluid is delivered such that its hydraulic action is lower than the spring force of the springs), the spring action of the springs, not shown, causes the driving actuators 140, 150 to telescopically retracted back into their respective retracted, rest positions. As a result, the wiper 130 is moved along the first line X downward towards the surface 210 of the sensor lens 200 until bringing into contact and the wiper 130 is driven to the right in the drawing along line Y away from the sensor lens 200 while the surface 210 of the sensor lens 200 is wiped. In this example, the wiper 130 could be driven along line X to a third position, that is, an intermediate position between the first position and the second position with the wiper 130 contacting the surface 210 of the target device 200. The spring force of the spring helps the wiper 130 to better follow the surface 210 of the target device 200 and to return the first wiper driving actuator 140 back to its retracted position.

The washing arrangement 100 in the first and second examples shown in FIGS. 1-8 is very simple since the wiper 130 is driven along two different lines X, Y by the same driving source, that is, the washing fluid flowing through the driving actuators 140, 150, without the use of electric components such as an electric motor resulting in that safety is not compromised by the use of washing fluid.

Movement of the wiper by the first wiper driving actuator and the second wiper driving actuator allows the wiper to avoid parts of the motor vehicle from being contacted or collided while the wiper 130 can be thus safely and efficiently moved towards and away from the surface 210 of the target device 200 to be cleaned, e.g. a cylindrical sensor, and also driven onto said surfaces 210 while wiping it so as to clean and dry at least one portion thereof, while reducing the amount of washing fluid used in the cleaning operation. On the other hand, when the wiper driving actuators 140, 150 have reached their retracted or collapsed condition, the wiper 130 may be positioned so as to be hidden by other parts or at least not hindering within the target device field of vision.

In some examples, it may be preferred that the spring mechanisms have mutually different spring rates such that the wiper 130 is driven by the first wiper driving actuator 140 and the second wiper driving actuator 150 at different times from the first position to the second position along the first line X or the second line Y. However, driving of the wiper 130 along the first line X may be also performed simultaneously with the step of driving of the wiper 130 along the second line Y if required.

Although only a number of particular examples of the present washing arrangement have been disclosed herein, it will be understood by those skilled in the art that other alternative examples and/or uses and obvious modifications and equivalents thereof are possible.

For example, although the washing fluid is prevented from being injected from the nozzles 120 as the wiper 130 is driven contacting the surface 210 of the sensor lens 200, examples where washing fluid is injected as the wiper 130 is driven contacting the surface 210 of the sensor lens 200 are also envisaged in order to extend washing action by the wiper 130.

The present disclosure thus covers all possible combinations of the particular examples that have been described herein.

Reference signs related to drawings and placed in parentheses in a claim, are solely for attempting to increase the intelligibility of the claim and shall not be construed as limiting the scope of the claim.

Thus, the scope of the present disclosure should not be limited by particular examples but should be determined only by a fair reading of the claims that follow.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed but will include all embodiments falling within the scope thereof.

What is claimed is:

1. A washing arrangement for washing a surface of a target device in a motor vehicle, the washing arrangement comprising:
    at least one first wiper driving actuator telescopically operable by the washing fluid to move at least one wiper from a first position to a second position or from the second position to the first position along a first line;
    at least one second wiper driving actuator operable to move said wiper from a first position to a second position or from the second position to the first position along a second line; and
    at least one nozzle for injecting washing fluid towards the surface of the target device to be washed, wherein the first and second wiper driving actuators are mechanically linked to each other such that, in use, the wiper is driven by the first wiper driving actuator along the first line to contact at least one portion of the surface of the target device to be washed, and by the second wiper driving actuator along the second line to wipe said portion of the surface of the target device.

2. The washing arrangement of claim 1, wherein at least one second wiper driving actuator is telescopically operable by the washing fluid to move the wiper from a first position to a second position or from the second position to a first position.

3. The washing arrangement of claim 2, further comprising:
    a washing structure arranged for at least partially surrounding the surface of the target device, the washing structure carrying the at least one nozzle and the at least one wiper such that the at least one wiper contacts a side surface of the target device as the washing structure is driven by the second wiper driving actuator along the second line.

4. The washing arrangement of claim 1, further comprising:
    a washing structure arranged for at least partially surrounding the surface of the target device, the washing structure carrying the at least one nozzle, the at least one second wiper driving actuator, and the at least one wiper such that the at least one wiper contacts a side surface of the target device as the washing structure is driven by the second wiper driving actuator along the second line.

5. The washing arrangement of claim 4, wherein the washing arrangement is configured for:
    injecting washing fluid from the nozzle towards the surface of the target device to be washed;
    driving the washing structure by the first wiper driving actuator along the first line until the surface of the target device is contacted by the wiper; and
    driving the washing structure by the second wiper driving actuator along the second line with the wiper contacting the surface of the target device, thereby wiping off the injecting washing fluid.

6. The washing arrangement of claim 4,
    wherein the washing structure is circumferentially continuous and ring shaped, and at least two semi-ring elements of the washing structure are connected with each other through the first wiper driving actuator for driving the semi-ring elements from the first position to the second position or from the second position to the first position along the first line, and wherein the first line is in a radial direction.

7. The washing arrangement of claim 6, wherein the wiper is formed of a plurality of sections.

8. The washing arrangement of claim 4, wherein the first wiper driving actuator is operable by the second wiper driving actuator to move along a second line, the first wiper driving actuator carrying the at least one nozzle and the wiper such that the wiper contacts a surface of the target device as the washing structure is driven by the first wiper driving actuator along the first line.

9. The washing arrangement of claim 4, wherein the second line is inclined with respect to the first line.

10. The washing arrangement of claim 1, wherein the second line is inclined with respect to the first line.

11. The washing arrangement of claim 10,
    wherein the washing structure is circumferentially continuous and ring shaped, and at least two semi-ring elements of the washing structure are connected with each other through the first wiper driving actuator for driving the semi-ring elements from the first position to the second position or from the second position to the first position along the first line, and wherein the first line is in a radial direction.

12. The washing arrangement of claim 1, wherein the wiper is formed of a plurality of semi-cylindrical sections.

13. The washing arrangement of claim 12, further comprising:
    respective spring mechanisms for biasing the first and second wiper driving actuators along the first and second lines, respectively.

14. The washing arrangement of claim 1, further comprising:
    first and second spring mechanisms for biasing the respective first and second wiper driving actuators along the first and second lines, respectively.

15. The washing arrangement of claim 14, wherein said spring mechanisms have mutually different spring rates such that the wiper is driven by the first wiper driving actuator and by the second wiper driving actuator at different times from the first position to the second position along the first line or the second line.

16. The washing arrangement of claim 1, wherein the nozzle is configured for injecting washing fluid only when at least one of the first and second wiper driving actuators has been telescopically extended by a determined length.

17. The washing arrangement of claim 1, wherein at least one nozzle is fluidly linked to the first wiper driving actuator.

18. A method for washing a surface of a target device that is fitted on a vehicle, the method comprising:
- providing a washing arrangement as claimed in claim 1;
- injecting washing fluid from the nozzle towards the surface of the target device to be washed;
- driving the wiper by the first wiper driving actuator towards the surface of the target device to be washed along the first line; and
- driving the wiper by the second wiper driving actuator along the second line with the wiper contacting the surface of the target device.

19. The method of claim 18, wherein the washing arrangement comprises a washing structure at least partially surrounding the surface of the target device and carrying the at least one wiper, and wherein
- the step of driving the wiper along the first line is performed by driving the washing structure by the first wiper driving actuator from a second position to a third position along the first line; and wherein
- the step of driving the wiper along the second line is performed by driving the washing structure by the second wiper driving actuator from the second position to a third position with the wiper contacting the surface of the target device.

20. The method of claim 18, wherein washing fluid is prevented from being injected from the nozzle as the wiper is driven contacting the surface of the target device.

* * * * *